US009055518B2

(12) United States Patent
Vainola

(10) Patent No.: US 9,055,518 B2
(45) Date of Patent: Jun. 9, 2015

(54) RESOURCE SHARING IN COMMUNICATIONS SYSTEMS

(75) Inventor: Kati Marita Vainola, Hikiä (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 275 days.

(21) Appl. No.: 13/516,764

(22) PCT Filed: Dec. 18, 2009

(86) PCT No.: PCT/EP2009/067571
§ 371 (c)(1),
(2), (4) Date: Jun. 18, 2012

(87) PCT Pub. No.: WO2011/072755
PCT Pub. Date: Jun. 23, 2011

(65) Prior Publication Data
US 2012/0264466 A1    Oct. 18, 2012

(51) Int. Cl.
*H04B 7/00* (2006.01)
*H04W 48/18* (2009.01)
*H04W 48/00* (2009.01)
*H04W 48/16* (2009.01)

(52) U.S. Cl.
CPC .............. *H04W 48/18* (2013.01); *H04W 48/17* (2013.01); *H04W 48/16* (2013.01)

(58) Field of Classification Search
CPC ..... H04W 48/18; H04W 48/17; H04W 48/16; H04W 76/027; H04W 36/12; H04W 36/14
USPC ........ 455/500, 517, 435.1–435.3, 445, 426.1, 455/426.2, 550.1, 551, 422.1, 403, 561, 455/562.1, 4, 14.1–414.4; 370/328, 329, 370/338, 343, 310
See application file for complete search history.

(56) References Cited

U.S. PATENT DOCUMENTS 6,385,179 B1 * 5/2002 Malcolm et al. .............. 370/329
2004/0162077 A1   8/2004 Kauranen et al.
(Continued)

FOREIGN PATENT DOCUMENTS

EP              1280365 A2    1/2003
WO    WO 2004/075576 A1    9/2004
(Continued)

OTHER PUBLICATIONS

International Search Report and Written Opinion corresponding to International Application No. PCT/EP2009/067571, dated Sep. 28, 2010.
3GPP TS 23.251—V9.1.0 (Dec. 2009), 3rd Generation Partnership Project; Technical Specification Group Services and System Aspects; Network Sharing; Architecture and functional description (Release 9), pp. 1-19.

*Primary Examiner* — Keith Ferguson
(74) *Attorney, Agent, or Firm* — Squire Patton Boggs (US) LLP

(57) ABSTRACT

A method of handling a service request in a communication system comprising a radio access network providing radio access capability to a plurality of core networks, the method comprising: a BSC in the radio access network receiving a service request from a mobile terminal; the BSC making a first core network selection; the BSC sending the service request received to a first MSC; the MSC communicating with the mobile terminal in handling the service request; the MSC sending an IMSI of the mobile terminal to the BSC; in the event that the core network selected as a result of the first core network selection does not provide service, the radio access network making a second core network selection; and the BSC sending the service request and the IMSI to the core network selected as a result of the second core network selection.

20 Claims, 2 Drawing Sheets

(56) References Cited

U.S. PATENT DOCUMENTS

2005/0090255 A1* 4/2005 Kuchibhotla et al. ...... 455/435.2
2011/0276701 A1* 11/2011 Purnadi et al. ................ 709/227

FOREIGN PATENT DOCUMENTS

| WO | WO 2005/109936 | 11/2005 |
| WO | WO 2006/103093 | 10/2006 |

* cited by examiner

RESOURCE SHARING IN COMMUNICATIONS SYSTEMS

This invention relates to sharing resources in communications systems. It is particularly, but not exclusively, related to a mobile communications system configured to enable different network operators to share radio access resources.

Over the past couple of decades, different generations of digital mobile communications systems have been developed. So-called second generation (2G) mobile communications systems were introduced to provide digital communications primarily for voice to enable subscribers to use mobile terminals to make and receive voice calls. An example of such a 2G system is the Global System for Mobile communications (GSM) system. Third generation (3G) communications systems followed having higher transmission rates which, in addition to voice communications, were specifically designed for transmission of non-voice data. An example of such a 3G system is the Universal Mobile Telecommunications System (UMTS) system.

A mobile communications system typically has a core network (CN) and a radio access network (RAN). The RAN corresponds to the base station system (BSS) of the system. The core network carries out the functions of mobility management (keeping track of the locations of mobile terminals) and switching communications connections enabling the mobile terminals to make and receive calls and to send and receive data. In 2G systems, the switching capability is embodied in 2G systems as a mobile switching centre, MSC, for circuit-switched (CS) communications and as a serving GPRS (general packet radio service) support node (SGSN) for packet switched (PS) communications. In 3G systems the switching capability is typically embodied as a mobile switching centre server, MSS and includes MSC functionality. The radio access network carries out the function of radio interface resource management in providing wireless connectivity to mobile terminals. It has a large number of base stations (embodied as base transceiver stations (BTSs) in 2G systems and Node Bs in 3G systems) and associated controllers (embodied as base station controllers (BSCs) in 2G systems and radio network controllers (RNCs) in 3G systems).

Mobile communications systems are complex and expensive to implement. One reason for the expense is the need to provide and maintain base stations and associated control functionality distributed over a large area.

In view of the high costs involved in installing and maintaining radio access networks, it has been proposed that a single such network be shared by a number of network operators. In proposed implementations there is a shared radio access network which provides radio communications to mobile terminals for separate and distinct core networks which are under the control of different network operators. The network operators share radio access network elements such as base stations and associated control functionality and, in addition, also share associated radio resources such as radio channels and frequencies. In addition to this shared radio access network, the operators may have additional dedicated radio access networks which are not shared, for example a 3G system radio access network might be shared among a number of core network operators but at least one of these network operators might have its own non-shared 2G or 3G radio access network.

Two architectures for sharing of 3G networks are defined in technical standard TS 23.251 "Network Sharing; Architecture and functional description". These are the Multi-Operator Core Network (MOCN) configuration and the Gateway Core Network (GWCN) configuration. In the MOCN configuration a radio access network is shared. In the GWCN configuration, in addition to the radio access network being shared, MSCs and SGSNs are shared and are referred to as a "gateway core network" in the sense that they provide a gateway between the sharing network operators' own networks and the shared radio access network. It should be noted that in this context, the sharing network operator's own networks refers to equipment under the sharing network operator's control which provides that network operator's services to its subscribers and to those of other network operators.

At the moment, network operators are showing particular interest in MOCN configuration network sharing, because it does not require a shared gateway core network part. Instead, connectivity to each sharing network operator can be provided directly from the radio access network.

The MOCN configuration reference architecture for 3G systems set out in technical standard TS 23.251 is shown in FIG. 1. In the MOCN configuration 100, CNs A 110, B 112 and C 114 together share a 3G radio access network 120. The MOCN configuration 100 as such does not require support from 3G mobile terminals although it is possible that they may support core network selection.

Another proposal, referred to as multi-operator BSS (MOBSS) enables two or more operators to share the BSC and BTS equipment of a GSM RAN.

According to a first aspect of the invention there is provided a method of handling a service request in a communication system comprising a radio access network providing radio access capability to a plurality of core networks, the method comprising:
the radio access network receiving a service request from a mobile terminal;
the radio access network making a first core network selection;
the radio access network sending the service request received to a core network selected as a result of the first core network selection;
the core network selected as a result of the first core network selection communicating with the mobile terminal in handling the service request;
in the event that the core network selected as a result of the first core network selection does not provide service, the radio access network making a second core network selection; and
the radio access network sending the service request to the core network selected as a result of the second core network selection.

According to a second aspect of the invention there is provided a method of handling a service request in a communication system comprising a radio access network providing radio access capability to a plurality of core networks, the method comprising:
a mobile terminal sending the service request;
the radio access network communicating with the mobile terminal;
the mobile sending identity information relating to the mobile terminal;
the radio access network using the identity information to select a core network from the plurality of core networks to handle the service request;
the radio access network sending the service request to the selected core network.

Preferably, the communications system is a mobile communications system. It may be a second generation mobile communications system, such as GSM. It may be configured into a Multi-Operator Core Network (MOCN) configuration.

Preferably, network access is granted according to a core network operator deciding to provide it.

Preferably, the identity information is mobile terminal related, rather than being related to, say, the network or to a particular network element. It may be related to a subscriber. It may identify a subscriber. It may be an IMSI.

The system may be configured to obtain an identifier from the mobile terminal which enables a deterministic choice of core network operator to be made. The radio access network may obtain an identifier which identifies the subscriber identity from the mobile terminal.

Preferably, the core network selected as a result of the first core network selection sends identity information relating to the mobile terminal.

Preferably, the radio access network sends the service request to the core network selected as a result of the second core network selection together with the identity information.

The system may be configured to choose a number of core networks in turn until one is found which decides to provide access.

The mobile terminal may send the service request when it determines that it is in a new location area. It may initiate a location updating request. In one embodiment once the mobile terminal has determined that it is in a new area, it initiates a service request in respect of packet switched access and a service request in respect of circuit switched access.

A network element in the radio access network may examine the service request to check whether it contains a valid network identifier. If no valid network identifier is found, the network element may seek to obtain an identifier from the mobile terminal.

The network element may use the mobile terminal related identity information and a mapping between indicating correspondence between mobile terminal related identity information items or ranges of mobile terminal related identity information items and core network identifiers to determine which core network operator is appropriate to serve the mobile terminal.

The mobile terminal may also send out a Routing Area Updating Request message. The radio access network may check the mobile terminal related identity information for the purpose of obtaining packet switched access.

The radio access network may be able to make the correct core network selection procedures independently for circuit switched and packet switched connections.

Send sequence number checking in a network element which handles switching may be deactivated in order to avoid synchronisation problems in MM level signalling caused by additional direct signalling between the radio access network and the mobile terminal.

In one variant, there may be re-routing from core network to core network. Re-routing may be handled by a network element in the radio access network. Re-routing may be handled by cooperation between a network element in the radio access network and ones, in turn, of network elements which handles switching in the core networks.

Preferably the communications system comprises a BSC configured to provide multi-operator core network support with re-routing-based core network selection. It may comprise an interface configured to be in use so that coordination of packet switched access and circuit switched access is handled by coordination between a serving node for packet switched access and a switching network functionality for circuit switched access.

The mobile terminal may send a combined updating request message in respect of both packet switched and circuit switched access. This message may be received by a network element in the radio access network and examined to check whether it contains a subscriber identifier or whether it contains a network identifier. If no such identifier is found, the network element may carry out a random or a weighted round-robin choice of candidate core networks in turn from among core networks sharing the radio access network. The network element may request access from a first candidate core network. It may obtain an identifier from the first candidate core network.

A network element in the radio access network may send the service request to a serving node for packet switched access. This node may forward a part of the service request in respect of circuit switched access to a switching network functionality in the same core network. The serving node and the switching network functionality may perform respective analyses of an identifier to determine whether the mobile terminal is entitled to be provided with access.

The serving node and the switching network functionality may cooperate with each other over an interface between them in order to carry out circuit switched and packet switched coordination. This may be over a Gs interface.

Preferably, if a network element in the radio access network determines that the service request is rejected, it may make a random or a weighted round-robin choice of another candidate core network. The network element may store a message related to such a rejection for further processing. In one embodiment, it may receive a number of rejection messages and may select the most appropriate and send it to the mobile terminal in the event that no core network is found to be able to provide access to the mobile terminal.

A network element in the radio access network may delete, or otherwise cause no longer to be stored, the service request once it receives a message from a core network indicating that service will be provided.

In another variant of the invention, a network element in the radio access network may make a random or a weighted round-robin choice from among sharing core networks of a core network when it receives the service request.

The network element may select an initial core network which will assist in circuit switched and packet switched coordination. The network element may send the service request to this initial core network in order to obtain the mobile terminal related identity information which is used to carry out circuit switched and packet switched coordination so that an appropriate service request can be sent to relevant parts of the same core network.

The initial core network may communicate with the mobile terminal and obtain from it a response containing the mobile terminal related identity information. The initial core network may then respond to the service request with a reject message indicating that the initial core network is not willing to provide service at this stage. This may be, for example because circuit switched and packet switched coordination has not yet been performed by the radio access network.

If the core network selected as a result of the first core network selection is selection of an initial core network, then the first core network selection is referring to the selection of the initial core network as the first selection of any core network. After this may be the selection of a first core network for the purpose of requesting whether it will provide service.

The core network may determine from the service request whether the radio access network has carried out circuit switched and packet switched coordination. This may be done on the basis of the absence from the service request of the mobile terminal related identity information. The core network may reject the service request with a indication that circuit switched and packet switched coordination needs to be carried out. The core network may send the mobile terminal related identity information with such an indication. A network element in the radio access network may use the identifier to carry out the coordination.

It will be understood that a network element may send a service request to the core network which is based on, or functionally the same as, the service request received from the mobile terminal. The network element may send a number of such service requests. They may be sent sequentially. They may differ in terms of the information they contain, for example one might be sent without a subscriber identifier and a subsequent one may contain such an identifier.

Preferably, a network element in the radio access network may make a random or a weighted round-robin choice from among sharing core networks of a first candidate core network after circuit switched and packet switched coordination has been carried out. The first candidate core network may be the same as the initial core network.

A network element may send the service request to a first candidate core network, and include with it the mobile terminal related identity information. The first candidate core network may check to see if the service request originates from a mobile terminal which the first candidate core network is able to serve. The first candidate core network may respond to the network element with an accept message indicating that the core network is willing to provide service or a reject message that service will not be provided.

If the first candidate core network reject the service request, a network element in the radio access network then makes another choice to determine which core network will be a second candidate core network and sends the service request to this core network, together with the mobile terminal related identity information. The second candidate core network may use the mobile terminal related identity information to determine whether service is to be provided. If the second core network rejects the service request, the radio access network may then make another choice to determine which core network will be a third candidate core network assuming that there is one available.

If the mobile terminal is rejected by all available core networks, the radio access network may select a service reject messages it has received from one of the core networks and send this reject message to the mobile terminal. The radio access network may select a reject message which has the "mildest" reject cause in order to avoid creating difficulties in the handling of subsequent service requests from the mobile terminal.

A message sent by the radio access network requesting service to the initial core network and a message sent to subsequent candidate core networks during re-routing may have the same message format. The message format may contain at least one of the following elements: a send sequence number; a re-routing indication flag; a re-routing indication element; a re-routing completed element; and a subscriber identifier.

The re-routing indication flag may be set by a network element in the radio access network. It may indicate that the network element supports radio access network sharing. It may tell the core network that it is to indicate if it is going to provide service to the mobile terminal or if it is going to carry out re-routing. In one embodiment, the flag indicates to a switching functionality that it should indicate whether re-routing has been completed or not.

The core network may react to the re-routing indication flag being set by sending a re-routing indication element in the case that the core network is not going to offer service to the mobile terminal. The re-routing indication element may be sent in a case in which the core network is an initial core network and circuit switched and packet switched coordination needs to be carried out. The re-routing indication element may be sent with a reject message.

The core network may react to the re-routing indication flag being set by sending a re-routing completed element in the case that the core network is going to offer service to the mobile terminal. The radio access network may react to the re-routing completed element by sending an accept message to the mobile terminal. The re-routing completed element may be sent with an accept message. The core network may indicate whether a re-routing indication element or a re-routing completed element applies by sending a response message in which a re-routing indication flag is set.

The mobile terminal related identity information may be sent if it has been received during previous message exchange with a core network. Sending of the mobile terminal related identity information may indicate that circuit switched and packet switched coordination has been performed.

In response to a service request message from the radio access network, the core network may respond with a re-routing information message. A re-routing information message sent by the initial core network and a re-routing information message sent by subsequent candidate core networks during re-routing to the radio access network may have the same message format. The re-routing information message may have at least one of the following elements: a re-routing indication flag; an accept message; an original request message; a subscriber identifier; a send sequence number; and a reject cause.

The re-routing indication flag may indicate whether re-routing is ongoing or completed. An accept message may be sent in the case that the re-routing indication flag indicates that re-routing is complete. The reject cause may indicate that the re-routing information message is being used to provide the mobile terminal identifier to the radio access network for the purposes of circuit switched and packet switched coordination. The reject cause may indicate that the re-routing information message is being used to indicate that service will not be provided by that core network and the service request needs to be sent to another core network.

Preferably, two core networks are sharing the radio access network. More than two core networks may be sharing.

According to a third aspect of the invention there is provided a communications system for handling a service request, the system comprising a radio access network providing radio access capability to a plurality of core networks, and a core network, the radio access network being capable of making a first core network selection, being capable of sending a service request received from a mobile terminal to the core network which has been selected as a result of the first core network selection, and being capable, in the event that the core network does not provide service, of making a second core network selection and being capable of sending the service request to the core network selected as a result of the second core network selection, the core network being capable of communicating with the mobile terminal in handling the service request.

According to a fourth aspect of the invention there is provided a network element in a radio access network providing radio access capability to a plurality of core networks, the network element comprising:

an input via which a service request is receivable from a mobile terminal;

a core network selector capable of making a first core network selection and subsequently a second core network selection in the event that the core network selected as a result of the first core network selection does not provide service;

an output via which the service request is transmittable to a core network selected as a result of the first core network selection, the service request being transmitted to the core network in order that it communicates with the mobile terminal in handling the service request, and via which the service request is transmittable to a core network selected as a result of the second core network selection.

According to a fifth aspect of the invention there is provided a computer program product comprising software code that when executed on a computing system performs a method of handling a service request in a communication system comprising a radio access network providing radio access capability to a plurality of core networks, the method comprising:

the radio access network making a first core network selection;

the radio access network sending a service request received from a mobile terminal to a core network selected as a result of the first core network selection;

the core network selected as a result of the first core network selection communicating with the mobile terminal in handling the service request;

in the event that the core network selected as a result of the first core network selection does not provide service, the radio access network making a second core network selection; and the radio access network sending the service request to the core network selected as a result of the second core network selection.

Preferably, the computer program product has executable code portions which are capable of carrying out the steps of the method. Preferably, the computer program product is stored on a computer-readable medium.

According to further aspects of the invention, there is provided a system, a network element, and a computer program product provided in accordance with the second aspect of the invention.

An embodiment of the invention will now be described, by way of example only, with reference to the accompanying drawings in which:

FIG. 1 is described in the foregoing.

Figure 1:
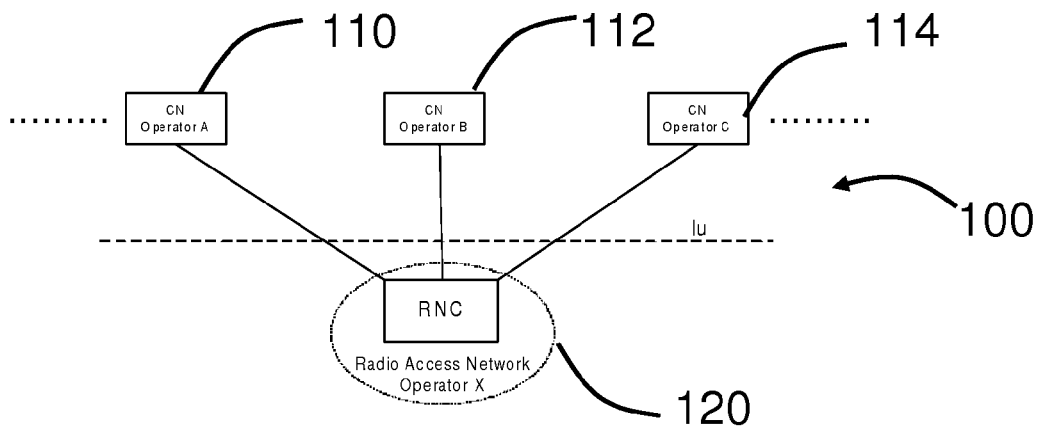
FIG. 1 shows a 3G MOCN architecture.
Figure 2:
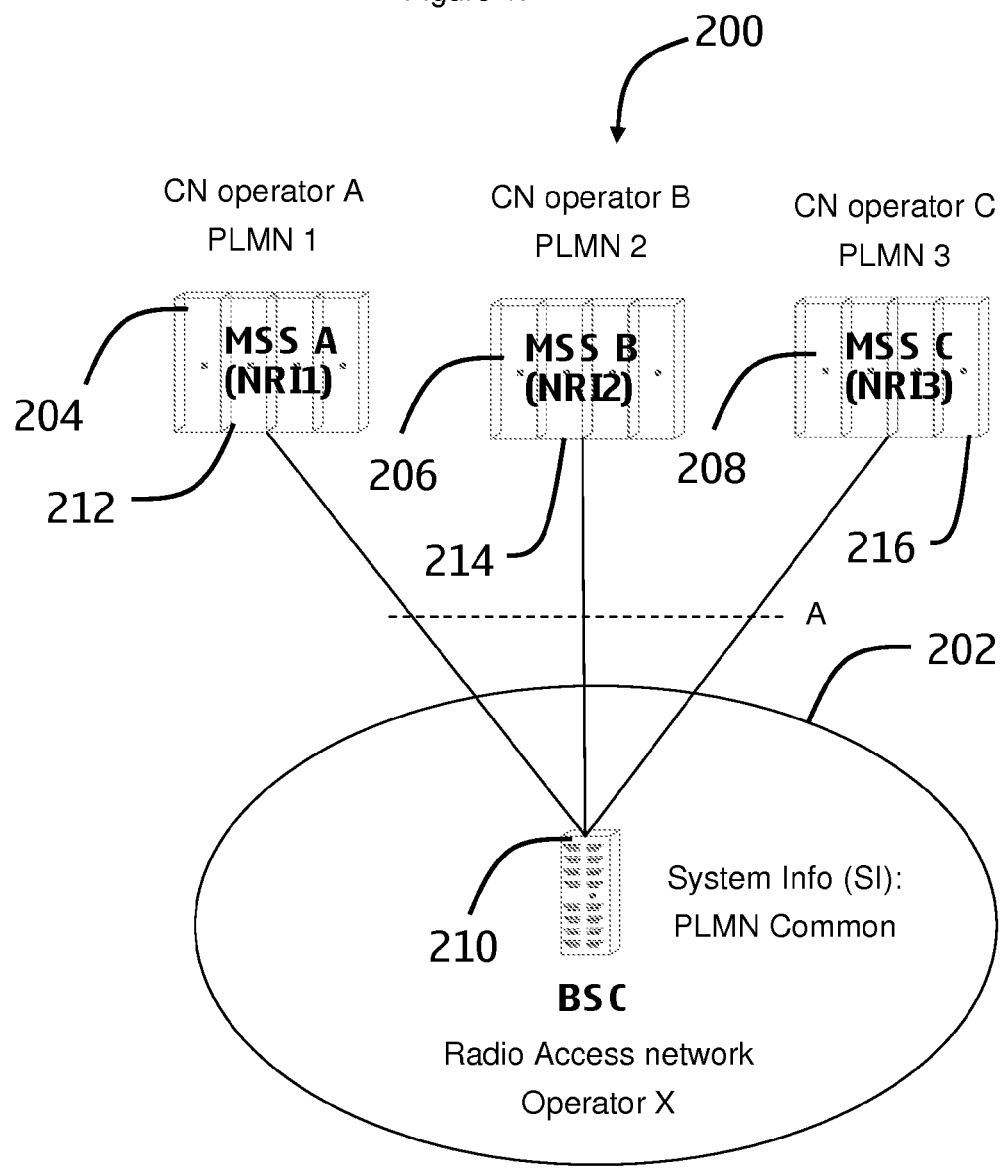
FIG. 2 shows a 2G MOCN architecture.

Embodiments of the invention will now be described with reference to FIG. 2. This is an embodiment of a MOCN configuration system in which core networks together share a 2G radio access network. Although it has an architecture similar to that described above in relation to FIG. 1, the system of FIG. 2 is a 2G system rather than a 3G system. As can be see in FIG. 2, a 2G system 200 comprises a common shared radio access network 202 and three core networks, a core network CN A 204, a core network CN B 206, and a core network CN C 208. The common radio access network 202 is not shown in detail and is represented simply by a BSC 210.

Naturally, it will be understood that in a functioning system, the radio access network comprises numerous BSCs and other network elements such as BTSs. The core networks 204, 206, and 208 are not shown in detail and each is represented simply by mobile switching centres (MSCs), respectively 212, 214, and 216. Naturally, it will be understood that in a functioning system, the core networks 204, 206, and 208 comprise numerous MSCs, SGSNs, and other network elements.

The common shared radio access network 202 is connected individually to each of the core networks 204, 206, 208 over an interface referred to as the A-interface 218 in respect of CS communications and over an interface referred to as the Gb-interface (not shown) in respect of PS communications. A protocol referred to as the Base Station System Application Part (BSSAP) is employed across the A interface to transport MM (Mobility Management) and CM (Connection Management) information to and from the MSC (Mobile Switching Centre). A protocol referred to as the Base Station System GPRS Protocol (BSSGP) is employed across the Gb interface to transport GPRS Mobility Management (GMM) and GPRS Session Management (SM) information to and from the SGSN for control of GSM packet data services. The common shared radio access network 202 is wirelessly connected to mobile stations (MSs) over an air interface.

In the following, different variants of the invention are described. However, for the sake of simplicity, features common to all of the variants are described first and then details of the variants are described.

In the shared network according to the invention, the identity of the public land mobile network, that is the PLMN-id (comprising the mobile network code (MNC) and the mobile country code (MCC)) provided by the radio access network does not uniquely identify a particular core network operator but instead is used by the shared radio access network and so identifies all of the sharing core networks. Accordingly, only one PLMN identifier (here referred to as a Common PLMN) is broadcast at the radio interface.

In general terms, according to the invention, during initial access, when service is requested by an MS, one of available core networks is selected to serve the MS. This selection is carried out in an appropriate BSC 210 in the shared radio access network, that is one which is controlling the BTSs among which is the one communicating with by the MS at that time.

Network access is granted according to a core network operator deciding to provide it. The invention provides variants for two situations. In a first situation, the variant is configured in order to obtain an identifier from the MS which enables a deterministic choice of core network operator to be made. In this variant, the BSC obtains the international mobile subscriber identity (IMSI) from the MS.

In a second situation, the variant is configured in order to choose a number of core networks in turn until one is found which decides to provide access. In this second variant, if a first-selected candidate core network decides not to serve the MS, an attempt to obtain access is made to another candidate core network, and this continues until a core network is found that decides to serve the MS.

Both of these variants will now be described. They will be described according to the steps taken when an MS determines that it is in a new location area, that is a location area identified by a new Location Area (LA) Identifier which is broadcast by the RAN in respect of CS access and a new Routing Area (RA) Identifier which is broadcast by the RAN in respect of PS access, and needs to update the LA and RA Identifiers which it has stored. This may take place by the MS moving into a new area or by the MS having been switched on and determining that it is in an area identified by LA/RA Identifiers other than those currently stored in the SIM of the MS.

Referring now to the first variant, once the MS has determined that it is in a new area, it initiates a Location Updating Request. It should be noted that this Location Updating Request will contain an MS identifier, either:

(i) a temporary mobile subscriber identity (TMSI), although since this is an initial access in a new location area, the TMSI, allocated when the MS was provided with access in a previous LA and incorporating a Network Resource Identifier (NRI) for that previous LA (assuming that NRI allocation in the previous LA was in use), does not contain a valid NRI; or (ii) an IMSI although this is a rare case, for example after the MS is first switched on and has not yet received a TMSI from the network.

The BSC is configured with software to provide MOCN support with core network selection based on IMSI determination. This means that when the BSC receives a Location Updating Request message, it is to examine this message to check whether it contains a valid NRI in a TMSI. If no valid NRI is found, the BSC seeks to obtain the IMSI from the MS. Therefore, in response to the Location Updating Request, since the BSC does not know the IMSI, and if it is unable to obtain a valid NRI, the BSC seeks to obtain the IMSI by sending a mobility management (MM) message, in this case an MM Identity Request message. This message is sent by the BSC to the MS and specifies IMSI in the MM Identity Request message Identity Type information element (IE). Once the BSC has received the IMSI, it refers to a mapping between IMSIs and core network operator identifiers to determine which core network operator is appropriate to serve this particular MS. Naturally, this requires the BSC to be provided with mapping between IMSIs or IMSI ranges and corresponding core network operators. The IMSI is then mapped to identify the correct core network operator by the BSC. The mapping may be held internally in the BSC or may be in an external server. It sets out the relationship between IMSIs and their corresponding core network operators in a logical way for example in the form of a table. The BSC may include relevant operations, administration, and management (OAM) functionality to manage the table.

Referring to the foregoing, is it stated that in some circumstance the IMSI is included in the Location Updating Request. In this case, there is no need for the BSC to ask the MS to provide the IMSI and core network operator selection is simply carried out by the BSC using the received IMSI and referring to the mapping between IMSIs and core network operator identifiers.

In a similar way, the MS may also send out an RA Updating Request message which is received and acted upon by the BSC to obtain and check the IMSI of the MS for the purpose of obtaining PS access.

In this variant, the BSC is able to make the correct core network selection procedures independently for CS and PS connections, because it obtains the IMSI separately in respect of each type of Updating Request. As a result, it does not have to match up CS and PS Updating Requests so that they can both be sent to the same operator core network, that is it does not have to carry out CS/PS coordination. However, CS/PS coordination can be carried out by using the Gs interface in a way corresponding to that described in the following, if this is desired.

Once the BSC has determined which core network is appropriate to serve this particular MS, it sends the Location Updating Request message and the RA Updating Request message to the relevant MSC and SGSN. Since it has been confirmed that this is the correct core network, the MSC and SGSN should respond with a Location Updating Accept message and an RA Updating Accept message and from this point the MS can be served by this core network. If for some reason the MSC or SGSN declines to provide service, it will respond with a Location Updating Reject message or an RA Updating Reject message.

According to this variant of the invention, the BSC signals directly with the MS at the MM level to generate an additional message exchange which is not part of the standardised message exchange involved in the location update procedure. Therefore, it becomes necessary to deal with the issue of message send sequence numbering. Send sequence numbering is applied to messages for CS signalling in upper layer message flows in order to enable an MSC to identify potentially duplicated messages in the uplink direction. In order to avoid synchronisation problems in the MM level signalling send sequence numbering caused by this additional direct signalling between the BSC and the MS, send sequence number checking in the MSC is deactivated. This may be controlled by relevant OAM functionality. Send sequence number deactivation is not an issue for the PS part of the core network because it does not use this kind of sequence numbering.

This first variant requires some modification to take place in the network side. In the particular embodiment of the invention described, the network side is modified as follows:

(i) the BSC is modified to handle sending the MM Identity Request to the MS to obtain the IMSI and receiving the IMSI, to have and maintain the IMSI-to-core network operator mapping table, and to run the core network selection process according to the IMSI-to-core network operator mapping table; and (ii) the MSC is modified to disable send sequence number checking.

As far as the MS is concerned, since it is simply responding to the kind of request coming from a core network which it normally responds to, it is not necessary to modify the radio interface. The SGSN is also not modified.

An advantage of this first variant is that because the BSC is able to make the right selection by itself for both CS and PS connections, the re-routing functionality required in the second variant (which is described in the following) is not required.

Referring now to the second variant, two embodiments will be described which are based on re-routing from core network to core network. In a first re-routing based embodiment, re-routing is handled by the BSC. In a second re-routing based embodiment, re-routing is handled by cooperation between the BSC and ones, in turn, of the core networks elements (that is the MSC and the SGSN) which are sharing a RAN.

The first embodiment of the second variant will now be described. Once the MS has determined that it is in a new area, it initiates a Location Updating Request and a Routing Area Updating Request. As mentioned in the foregoing, it is possible that the BSC does not receive a valid NRI in the Location Updating Request and the Routing Area Updating Request.

The BSC is configured with software to provide MOCN support with re-routing-based core network selection. In addition, the Gs interface is configured to be in use so that coordination of LA and RA Updating Request messages is handled by coordination between the SGSN and the MSC over the Gs interface and by the use of combined LA/RA Updating Request messages.

Figure 3:
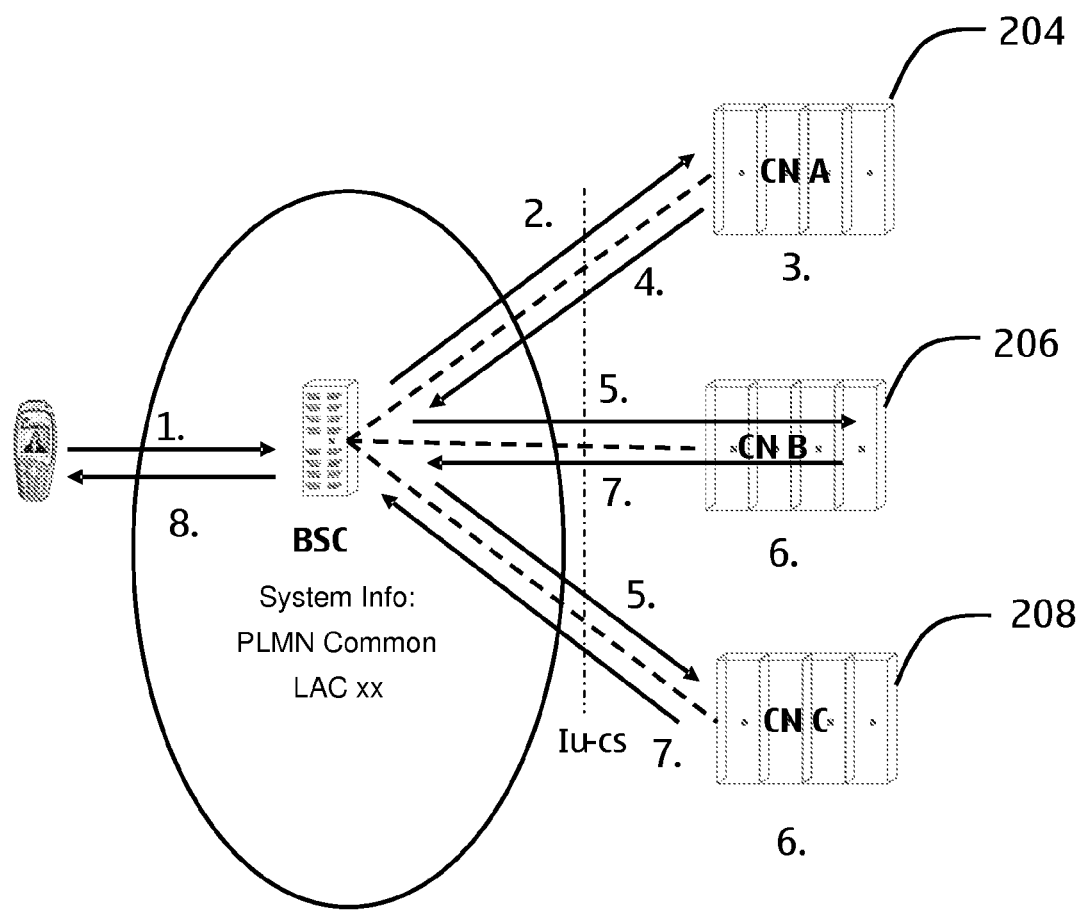
FIG. 3 shows the flow of messages in the 2G MOCN architecture of FIG. 2.

Re-routing-based core network selection is now described in relation to FIG. 3 which shows the following series of steps 1 to 8:

1. When the MS enters a new area where the Gs interface is in use, it sends a Attach Request message to the SGSN. The Attach Request message is a combined RA/LA Updating Request message and it also contains an LA Updating Request message. The BSC receives the combined LA/RA Updating Request message and examines it to check whether it contains an IMSI or a valid NRI in a TMSI. If no IMSI or valid NRI is found, the BSC carries out network selection according to the following.

2. In response to the combined LA/RA Updating Request message, since the BSC does not know the IMSI of the MS, and if it is unable to obtain a valid NRI from the TMSI, the BSC makes a random or a weighted round-robin choice of candidate core networks in turn from among the core networks 204, 206, and 208. In this case, the CN A 204 is chosen as a first candidate core network.

The BSC requests access from the first candidate core network. It stores the TMSI (or some other connection identifier) and the combined LA/RA Updating Request message from the MS (referred to as the original combined LA/RA Updating Request message). It then sends the combined LA/RA Updating Request to the SGSN. The SGSN forwards the LA Updating Request message to the MSC in the same core network. The MSC optionally returns a new TMSI that is sent to the MS via the SGSN.

3. The CN A 204, and in particular the SGSN and the MSC, perform respective IMSI analyses to determine whether the MS is entitled to be provided with access. The SGSN and the MSC request an IMSI from the MS, assuming it is needed, to identify the subscriber. If the SGSN and the MSC determine that they each will not provide access to the MS, for example because there is no relevant roaming agreement, no TMSI reallocation is made and access is not provided to the MS.

4. In the case that the SGSN and the MSC determine that they each will not provide access to the MS, the MSC sends its Updating Reject message to the SGSN and then the SGSN sends the respective Updating Reject messages with appropriate cause codes to the BSC.

5. The BSC monitors the updating procedure response to identify if the LA and RA Updating Requests are accepted or rejected, that is by checking whether Updating Accept or Updating Reject messages are received. If they are rejected, the BSC makes a random or a weighted round-robin choice of a second candidate core network and initiates the original combined LA/RA Updating Request message (stored at step 2) towards the second candidate core network. In this case, the CN B 206 is chosen as a second candidate core network. The BSC also stores the LA and RA Updating Reject messages from the MSC and SGSN for further processing, that is to be used in the selection of the most appropriate cause code that is sent to the MS in the event that no core network is found to be able to provide access to the MS. A rejection by the core network CN 206 leads to the BSC initiating the original combined LA/RA Updating Request message (stored at step 2) towards the next core network chosen as a candidate, that is the third candidate core network. In this case, this is the CN C 208.

6. If the SGSN and the MSC of any core network determine that they each will provide access to the MS, TMSI reallocation is made and a TMSI (including MSC's NRI) is generated in the MSC and a P-TMSI (including SGSN's NRI) is generated in the SGSN. The SGSN and the MSC which accepted the RA and LA Updating Request messages are then able to serve the MS.

7. The MSC sends its Updating Accept message to the SGSN and then the SGSN sends the respective Updating Accept messages containing the P-TMSI and the TMSI respectively to the BSC. At this point, the stored original combined LA/RA Updating Request can be removed from the BSC.

8. The BSC forwards the respective Updating Accept messages containing the P-TMSI and the TMSI to the MS.

This embodiment of the second variant requires some modification to take place in the network side. In the particular embodiment of the invention described, the network side is modified as follows:

(i) the BSC is modified to store the original Location Updating Request message, to carry out the core network selection process, to re-route and reattempt core network selection in the event that a previous candidate core network has rejected a Location Updating Request, and to coordinate the responses provided by the core networks to the MS; and (ii) the MSC is modified to disable send sequence number checking (this may be controlled by relevant O&M functionality).

As far as the MS is concerned, since it is simply responding to the kind of request coming from core network which it normally responds to, it is not necessary to modify the radio interface, that is, there are no signalling changes in the BSSAP. Furthermore, the SGSN is also not modified.

As will be understood from the foregoing, CS/PS coordination is done with the MSC and SGSN cooperating via the Gs interface.

In an alternative implementation of the invention, when the BSC receives the IMSI from the first candidate core network for either CS or PS access, the BSC analyses the IMSI in order to identify which the subscriber's home network operator (since the MCC and the MNC are included in the IMSI) and then with an appropriate mapping table, choose the correct core network. The same process could be done separately for CS and PS access. In this case, the BSC would not need to do the CS and PS coordination based on the TMSI and the P-TMSI.

The second embodiment of the second variant will now be described. In order to implement this embodiment, specific messaging changes are made to the BSSAP in order to carry out re-routing. Although this is described mainly with reference to message exchange between the BSC and MSC for the purpose of requesting CS access, corresponding changes can be applied to message exchange between the BSC and the SGSN for the purpose of requesting PS access as is explained in the following.

At the outset, the BSC receives the Location Updating Request message and the Routing Area Updating Request message from the MS but does not have an IMSI for the MS. The BSC makes a random or a weighted round-robin choice from among sharing core networks of a core network which will assist in CS and PS coordination. The BSC sends the Location Updating Request message and the Routing Area Updating Request message to this initial core network (respectively to the MSC and the SGSN of this core network) in order to obtain the IMSI which relates to these Request messages so that it is able to coordinate them so that they are both sent to the same network in a subsequent service request. In dealing with these Request messages, the initial core network communicates with the MS and obtains from it a response containing the IMSI for each Request message (assuming, of course, that the IMSI is not readily available in the initial core network). The initial core network then responds to the Request messages with respective Reject messages indicating that the initial core network is not willing to provide the relevant CS and PS services at this stage, before the CS/PS coordination has been performed by the BSS.

It should be noted that the MSC of a core network sent a Location Updating Request from the BSC identifies to the MSC the need for CS/PS coordination based on whether or not the IMSI accompanies the Location Updating Request. If the IMSI is missing, the BSC has not yet had the possibility to perform CS/PS coordination. As a result, the MSC makes a decision to reject the Location Updating Request, obtains the IMSI with a cause "CS/PS coordination required" and the MSC includes also IMSI towards BSC to be available for the coordination. Similar actions are taken by the SGSN.

At this point, the BSC has the IMSI and is able to coordinate the Location Updating Request message and the Routing Area Updating Request message.

The BSC then makes a random or a weighted round-robin choice from among sharing core networks of a first candidate core network. The first candidate core network can also be the same as the initial core network.

The BSC then sends the Location Updating Request message and the Routing Area Updating Request message to the first candidate core network, and includes the IMSI with these Request messages. The first candidate core network checks to see if the Location Updating Request message and the Routing Area Updating Request messages originate from an MS which the first candidate core network serves. The first candidate core network uses the IMSI from the Request messages for the purposes of authentication and to check it against roaming agreement lists. The first candidate core network then responds to the Request messages with respective Response messages. These might be Accept messages indicating that the core network is willing to provide the relevant CS and PS services or Reject messages that these services will not be provided.

If the first candidate core network responds with Accept messages, the BSC can then arrange that the first candidate core network will provide CS and PS service to the MS.

If the first candidate core network responds with Reject messages, the BSC then makes another choice to determine which core network will be a second candidate core network by making a random or a weighted round-robin choice, from among those sharing core networks not yet chosen, of a second candidate core network. The BSC sends the Location Updating Request message and the Routing Area Updating Request message to the second candidate core network, and includes the IMSI with these messages The second candidate core network checks to see if the Location Updating Request message and the Routing Area Updating Request messages originate from an MS which the second candidate core network serves. The second candidate core network uses the IMSI from the Request messages for the purposes of authentication and to check it against roaming agreement lists. The second candidate core network then responds to the Request messages with respective Response messages. These might be Accept messages indicating that the core network is willing to provide the relevant CS and PS services or Reject messages that these services will not be provided.

If the second candidate core network responds with Accept messages, it can then be arranged that the second candidate core network will provide CS and PS services to the MS.

If the second core network responds with Reject messages, the BSC then makes another choice to determine which core network will be a third candidate core network assuming that there is one available. If there is a third candidate available, the BSC follows the procedure described above.

Eventually, a point is reached when either a candidate core network has accepted the Requests for service from the MS or all potential candidate core networks have rejected the Request. At this point, if MS is rejected by all available core networks, the BSC selects one of the Location Updating Reject messages it has received from the core networks and sends it to the MS. The BSC selects the Reject message which has the "mildest" reject cause in order, for example, not to totally block the MS from the PLMN.

Some detail will now be provided to describe the message format used by the BSC to carry out BSSAP signalling with the core networks. This message is used by the BSC to send Request messages to MSCs of the core networks. It should be noted that this message format is used both when the BSC communicates with the initial core network and when it communicates with the candidate core networks during re-routing.

The message format used is a BSSAP COMPLETE LAYER 3 INFORMATION message. This is a known type of message and it is normally used to convey a Location Update Request over the A-interface. The Location Updating Request is contained in a Layer 3 Information information element. However, according to the invention, it additionally has the following elements:

(a) NAS (non-access stratum) Sequence Number, or send sequence number. This is sent if it has been received from a previous message exchange with a core network during re-routing. This number is the value of the send sequence number of the last message received during message flow involved with Mobility Management and Connection Management and it is forwarded by the core network to allow the next core network to have correct send sequence number in place.

(b) Re-routing Indication Flag. This is a flag which when set indicates that the BSC supports 2G sharing and it expects the core network to use the re-routing procedure if needed, or indicate if the MSC is going to provide service to the MS. This flag indicates to the MSC that it should indicate whether the re-routing has been completed or not, and in this embodiment that it should respond with:

(i) a Re-routing Indication IE (together with Location Updating Reject message) in the case that the MSC is not going to offer service to the MS or in the case when the core network is an initial core network and the BSC needs to carry out CS/PS coordination; or (ii) a Re-routing Completed IE (together with Location Updating Accept message) in the case that the MSC is going to offer service to the MS and based on the Re-routing Completed information the BSC can send an accept message to the MS. The MSC indicates whether (i) or (ii) applies by sending a response message in which a Re-routing indication flag is set and the relevant other information is included.

(c) IMSI. This is sent if it has been received during previous message exchange with a core network. It indicates that CS/PS coordination has been performed.

(a), (b), and (c) are added to the BSSAP COMPLETE LAYER 3 INFORMATION message as separate information elements.

The format of this message is shown below:

| INFORMATION ELEMENT | DIRECTION | TYPE | LEN |
|---|---|---|---|
| Message Type | BSS-MSC | M | 1 |
| Cell Identifier | BSS-MSC | M | 3 – 10 |
| Layer 3 Information | BSS-MSC | M (note 8) | 3 – n |
| Chosen Channel | BSS-MSC | O (note 1) | 2 |
| LSA Identifier List | BSS-MSC | O (note 2) | 3 + 3n |
| PADU | BSS-MSC | O (note 3) | 3 – n |
| Codec List (BSS Supported) | BSS-MSC | O (note 4) | 3 – n |
| Re-routing indication flag | BSS-MSC | O (note 5) | |

| INFORMATION ELEMENT | DIRECTION | TYPE | LEN |
|---|---|---|---|
| IMSI | BSS-MSC | O (note 6) | |
| NAS Sequence Number | BSS-MSC | O (note 7) | |

(note 1):
This element is optionally used by the BSS to give the MSC a description of the channel rate/type on which the initial layer 3 message was received.
(note 2):
This element shall be included at least when the current cell belongs to one or more LSAs.
(note 3):
This element is optionally used by the BSS to provide Location Services related information to the MSC.
(note 4):
Codec List (BSS Supported) shall be included, if the radio access network supports an IP based user plane interface.
(note 5):
This element is included when 2G sharing is supported to indicate to the MSC that it needs to respond with a Re-routing Information message.
(note 6):
IMSI is sent if received from a previously attempted core network and indicates that CS/PS coordination has been performed.
(note 7):
NAS sequence number is sent if received from a previously attempted core network.
(note 8):
This element includes the original LU Request message from the MS.

Some detail will now be provided to describe the message format used to send a Response messages from the MSC of a core network to the BSC, sent in response to the BSSAP COMPLETE LAYER 3 INFORMATION message and additional information elements. It should be noted that this message format is used both by the initial core network and the candidate core networks.

The message is referred to as a RE-ROUTING INFORMATION message. This is a new message and it is sent by the MSC to respond to the BSSAP COMPLETE LAYER 3 INFORMATION message. In addition to conveying a Response message to the Location Update Request message, it has the following elements:

(a) Re-routing Indication Flag. This indicates whether re-routing is ongoing or completed. Re-routing is started when BSC sends the first attempt to one core network and is completed only after a core network indicates that it will provide service to the MS.
(b) NAS-PDU. This contains the Location Updating Accept message in the case in which the Re-routing indication flag indicates that the MSC accepts the Locating Updating Request and indicates that re-routing is complete.
(c) Initial NAS-PDU. If re-routing is ongoing, the initial NAS-PDU contains the original Location Updating Request message which is transferred back to the BSC.
(d) IMSI.
(e) NAS Sequence Number.
(f) Reject cause. If the RE-ROUTING INFORMATION message is used by the MSC to provide the IMSI to the BSC for the purposes of CS/PS coordination, a Reject cause value is used to indicate this. If the RE-ROUTING INFORMATION message is used by the MSC to indicate that service will not be provided by that core network and the Location Updating Request needs to be sent to another core network, a Reject cause value is used to indicate this.

The format of this message is shown below:

| INFORMATION ELEMENT | DIRECTION | TYPE | LEN |
|---|---|---|---|
| Re-routing indication flag | MSC-BSS | M (note 1) | |
| NAS-PDU | MSC-BSS | M (note 2) | |
| Initial NAS-PDU | MSC-BSS | O (note 3) | |
| IMSI | MSC-BSS | O (note 4) | |
| NAS Sequence Number | MSC-BSS | O (note 5) | |
| Reject cause | MSC-BSS | O (note 6) | |

(note 1):
This element indicates if re-routing is completed or ongoing.
(note 2):
This element contains the response to the original LU request from the MS. The content of this element may be either LU Reject (if CS/PS coordination is not yet performed, or if the subscriber has no access to the MSC) or LU Accept if the Re-routing indication flag indicates "completed".
(note 3):
If re-routing is ongoing, the MSC indicates with this element the subscriber IMSI to the BSC for CS/PS coordination.
(note 4):
If re-routing is ongoing, the MSC sends in this element the original LU request from the MS to the BSC.
(note 5):
This element includes the NAS sequence number to be forwarded to the next attempted MSC, when re-routing is ongoing.
(note 6):
If re-routing is ongoing, this element indicates the Reject cause "CS/PS coordination" or one of the following MM level reject causes:
11: PLMN not allowed: the MS is not allowed to roam in the requested network.
12: Location Area not allowed: the MS has requested location updating to a location area where the MS is not allowed to operate.
13: Roaming not allowed in this location area: the MS has requested location updating to a network which supports national roaming to the network, but not in that location area.
14: Used for GPRS attach not accepted by the network: not relevant for the MSC.
15: No suitable cells in location area: the MS has requested location updating to a location area where MS is not allowed to operate (for example, due to GSM/UMTS access restrictions).

In a similar way, in order to carry out re-routing for the purpose of obtaining PS access, similar information element changes would be needed in BSSGP signalling messages in a UL-UNITDATA PDU sent from the BSC to the SGSN and a DL-UNITDATA PDU sent from the SGSN to the BSC, that is the UL-UNITDATA PDU should contain the same information elements as the BSSAP COMPLETE LAYER 3 INFORMATION message and the DL-UNITDATA PDU should contain the same information elements as the above described Re-routing information message.

In relation to this embodiment of the second variant, the BSC can be configured to store the Location Updating Request. This avoids the need to have an Initial NAS-PDU information element containing this Request.

It should be noted that unlike the previous embodiment, in this embodiment, Gs interface based CS/PS coordination is not required since the BSC is itself able to carry out this coordination by communicating with the MSC and the SGSN using the new signalling (that is the new messages) used between a core network and the BSC. Accordingly, CS/PS coordination and re-routing can be done even if Gs based coordination is not in use. It is preferred that CS/PS coordination is either carried out via the Gs interface or by using the new signalling rather than both being active at the same time.

It can be seen from the foregoing that the BSC carries out CS/PS coordination based on information provided by the MSC in the new Re-routing information message (which is sent over the A-interface) and/or the corresponding new information elements indicated in the DL-UNITDATA message (which is sent over the Gb interface).

It will be understood that the core network is able to identify the need for CS/PS coordination if the IMSI is not present in the BSSAP COMMON LAYER 3 INFORMATION message which is sent over the A-interface and/or UL-UNITDATA message which is sent over the Gb interface.

This embodiment of the second variant requires some modification to take place in the network side. In the particular embodiment of the invention described, the network side is modified as follows:

(i) the BSC is modified to store the original Location Updating Request message, to carry out the core network selection process, to re-route and reattempt core network selection in the event that a previous candidate core network has rejected a Location Updating Request, to handle with new BSSAP/BSSGP signalling extensions and to coordinate the responses provided by the core networks towards the MS;
(ii) the MSC is modified to provide re-routing support based on the new BSSAP signalling extensions; and
(iii) the SGSN is modified to provide re-routing support based on the new BSSAP signalling extensions.

An advantage of this embodiment is that once the IMSI has been obtained by one core network, subsequent core networks do not need to ask for it. In addition, subsequent core networks can determine that a BSC has already done CS/PS coordination, that is, that the BSC has associated the Location Updating Request with the corresponding RA Updating Request in order that they can be sent to the same core network for requesting CS and PS services.

Although the variants are described in terms of the relevant functionality being present in the BSC, it does not have to be present there and can instead be present at any convenient part of the BSS. It may be configured so that this functionality is accessible to the BSC.

Although it can be seen that the core network operators together sharing a 2G radio access network, each operator may also have its own dedicated radio access networks. For example, a network operator may have a network configured so that in certain geographical areas it has a 2G radio access network, a 3G radio access network, and certain other sharing arrangements and/or joint ventures such as GWCN configuration for 3G sharing.

An advantage of the invention is that when implemented, it is not necessary to modify mobile terminals. Existing and new terminals are supported.

While preferred embodiments of the invention have been shown and described, it will be understood that such embodiments are described by way of example only. Numerous variations, changes and substitutions will occur to those skilled in the art without departing from the scope of the present invention. Accordingly, it is intended that the following claims cover all such variations or equivalents as fall within the spirit and the scope of the invention.

The invention claimed is:

1. A method of handling a service request in a communication system comprising a radio access network providing radio access capability to a plurality of core networks, the method comprising:
   the radio access network receiving a service request from a mobile terminal;
   the radio access network making a first core network selection;
   the radio access network sending the service request received in a message to a core network selected as a result of the first core network selection requesting that the core network use a re-routing procedure to another core network, the message lacking identity information thus enabling the core network to determine that the radio access network needs to carry out circuit switched and packet switched coordination and the message requesting that the core network is to communicate with the mobile terminal in handling the service request and obtaining identity information from the mobile terminal;
   a base station controller of the radio access network receiving from the core network a re-routing message containing the identity information and a reject cause to indicate that the re-routing message is being used to provide the identity information to the radio access network for the purposes of circuit switched and packet switched coordination so that a request message in respect of circuit switched service and a request message in respect of packet switched service are both sent to the same network in order that the same network can provide both circuit switched service and packet switched service;
   the radio access network making a second core network selection; and
   the radio access network sending the service request to the core network selected as a result of the second core network selection in order that the core network can provide both circuit switched service and packet switched service.

2. A method according to claim 1 in which a number of core networks are chosen in turn until one is found which decides to provide access.

3. A method according to claim 1 in which a network element in the radio access network uses mapping between the identity information obtained from the mobile terminal and a corresponding core network identifier to determine which core network operator is appropriate to serve a subscriber.

4. A method according to claim 1 in which the radio access network is able to make the correct core network selection procedures independently for circuit switched and packet switched connections.

5. A method according to claim 1 in which the communications system comprises an interface between a serving node for packet switched access and a switching network functionality for circuit switched access used in the coordination of packet switched access and circuit switched access.

6. A method according to claim 1 in which the radio access network selects an initial core network which to assist in circuit switched and packet switched coordination.

7. A method according to claim 6 in which radio access network sends the service request to this initial core network in order to obtain the identity information from the mobile terminal which is used to carry out circuit switched and packet switched coordination so that an appropriate service request can be sent to relevant parts of the same core network.

8. A method according to claim 1 in which the core network sends the identity information obtained from the mobile terminal with such an indication.

9. A method according to claim 1 in which a re-routing indication flag is settable by a network element in the radio access network to indicate that the network element supports radio access network sharing.

10. A method according to claim 9 in which the re-routing indication flag tells the core network that it is to indicate if it is going to provide service to a subscriber or if it is going to carry out re-routing.

11. A method according to claim 9 in which the core network reacts to the re-routing indication flag being set by sending a re-routing indication element in the case in which the core network is an initial core network.

12. A method according to claim 1 in which sending of the identity information obtained from the mobile terminal by the radio access network to a core network indicates that circuit switched and packet switched coordination has been performed.

13. A method according to claim 1 in which the core network selected as a result of the first core network selection sends the identity information obtained from the mobile terminal.

14. A method according to claim 1 in which the radio access network sends the service request to the core network selected as a result of the second core network selection together with the identity information obtained from the mobile terminal.

15. A base station controller in a radio access network providing radio access capability to a plurality of core networks, the base station controller comprising:
an input via which a service request is receivable from a mobile terminal;
a core network selector capable of making a first core network selection and subsequently a second core network selection; and
an output via which the service request is transmittable in a message to a core network selected as a result of the first core network selection to request the core network to use a re-routing procedure to another core network, the message lacking identity information thus enabling the core network to determine that the radio access network needs to carry out circuit switched and packet switched coordination and the message requesting that the core network to communicate with the mobile terminal in handling the service request and obtain from it the identity information;
wherein the input is capable of receiving from the core network a re-routing message containing the identity information and a reject cause to indicate that the re-routing message is being used to provide the identity information to the radio access network for the purposes of circuit switched and packet switched coordination so that a request message in respect of circuit switched service and a request message in respect of packet switched service can both be sent to the same network in order that the same network can provide both circuit switched service and packet switched service and the output is capable of transmitting the service request to a core network selected as a result of a second core network selection in order that the core network can provide both circuit switched service and packet switched service.

16. A communication system for handling a service request, the system comprising a base station controller according to claim 15 and a network element according to claim 19.

17. A computer program product embodied on a non-transitory computer readable medium, the computer program product configured to control a computing system to perform a method of handling a service request in a communication system comprising a radio access network providing radio access capability to a plurality of core networks, the method comprising:
the radio access network making a first core network selection;
the radio access network sending a service request received from a mobile terminal in a message to a core network selected as a result of the first core network selection requesting that the core network use a re-routing procedure to another core network, the message lacking identity information this enabling the core network to determine that the radio access network needs to carry out circuit switched and packet switched coordination and the message requesting that the core network is to communicate with the mobile terminal in handling the service request and obtaining identity information from the mobile terminal;
a base station controller of the radio access network receiving the core network a re-routing message containing the identity information and a reject cause to indicate that the re-routing message is being used to provide the identity information to the radio access network for the purposes of circuit switched and packet switched coordination so that a request message in respect of circuit switched service and a request message in respect of packet switched service are both sent to the same network in order that the same network can provide both circuit switched service and packet switched service;
the radio access network making a second core network selection; and
the radio access network sending the service request to the core network selected as a result of the second core network selection in order that the core network can provide both circuit switched service and packet switched service.

18. A method of handling a service request in a communication system comprising a radio access network providing radio access capability to a plurality of core networks, the method comprising:
a core network selected by the radio access network as a result of the radio access network receiving a service request from a mobile terminal receiving the service request in a message requesting that the core network use a re-routing procedure to another core network, the message lacking identity information;
the core network determining that the radio access network needs to carry out circuit switched and packet switched coordination;
the core network communicating with the mobile terminal in handling the service request and obtaining the identity information from the mobile terminal;
the core network sending to a base station controller of the radio access network a re-routing message containing the identity information and a reject cause to indicate that the re-routing message is being used to provide the identity information to the radio access network for the purposes of circuit switched and packet switched coordination and so that the base station controller can make a second core network selection and send both a request message in respect of circuit switched service and a request message in respect of packet switched service to the core network selected as a result of the second core network selection in order that the core network can provide both circuit switched service and packet switched service.

19. A network element in a core network, the core network having been selected from among a plurality of core networks by a radio access network as a result of the radio access network receiving a service request from a mobile terminal, the network element comprising:
an input via which a message containing a service request is receivable from the radio access network, the message requesting that the core network use a re-routing procedure to another core network, the message lacking identity information, the core network determining that the radio access network needs to carry out circuit switched and packet switched coordination;
an output via which the core network communicates with the mobile terminal in handling the service request and obtaining the identity information from the mobile terminal and via which the core network sends to a base station controller of the radio access network a re-routing message containing the identity information and a reject cause to indicate that the re-routing message is being used to provide the identity information to the radio access network for the purposes of circuit switched and packet switched coordination and so that the base station controller can make a second core network selection and send both a request message in respect of circuit switched service and a request message in respect of packet switched service to the core network selected as a result of the second core network selection in order that the core network can provide both circuit switched service and packet switched service.

20. A computer program product embodied on a non-transitory computer readable medium, the computer program product configured to control a computing system to perform a method of handling a service request in a communication system comprising a radio access network providing radio access capability to a plurality of core networks, the method comprising:

a core network selected by the radio access network as a result of the radio access network receiving a service request from a mobile terminal receiving the service request in a message requesting that the core network use a re-routing procedure to another core network, the message lacking identity information;

the core network determining that the radio access network needs to carry out circuit switched and packet switched coordination;

the core network communicating with the mobile terminal in handling the service request and obtaining the identity information from the mobile terminal;

the core network sending to a base station controller of the radio access network a re-routing message containing the identity information and a reject cause to indicate that the re-routing message is being used to provide the identity information to the radio access network for the purposes of circuit switched and packet switched coordination and so that the base station controller can make a second core network selection and send both a request message in respect of circuit switched service and a request message in respect of packet switched service to the core network selected as a result of the second core network selection in order that the core network can provide both circuit switched service and packet switched service.

* * * * *